United States Patent [19]

Fernicola

[11] 4,034,184
[45] July 5, 1977

[54] WELDING TORCH OSCILLATOR CONTROL SYSTEM

[75] Inventor: Robert C. Fernicola, Florence, S.C.

[73] Assignee: Union Carbide Corporation, New York, N.Y.

[22] Filed: June 30, 1975

[21] Appl. No.: 592,098

[52] U.S. Cl. .............................. 219/124; 318/282
[51] Int. Cl.² ........................................ B23K 9/10
[58] Field of Search ......... 219/124, 125 R, 125 PL; 318/281, 282, 263, 266, 300, 612, 626, 686

[56] References Cited

UNITED STATES PATENTS

| 2,973,481 | 2/1961 | Frye | 318/282 X |
| 2,978,622 | 4/1961 | Wittke | 318/263 X |
| 3,230,341 | 1/1966 | Blackburn | 219/125 R |
| 3,400,315 | 9/1968 | Doucette | 318/266 X |
| 3,509,436 | 4/1970 | Hovance | 318/266 X |
| 3,586,943 | 6/1971 | Gonzalez | 318/282 X |
| 3,633,088 | 1/1972 | Kupersmith | 318/626 |
| 3,646,309 | 2/1972 | Smith, Jr. et al. | 219/125 PL |
| 3,783,222 | 1/1974 | Gwin et al. | 219/125 R X |
| 3,795,853 | 3/1974 | Whitehouse | 318/626 |

Primary Examiner—Bruce A. Reynolds
Assistant Examiner—Clifford C. Shaw
Attorney, Agent, or Firm—John R. Doherty

[57] ABSTRACT

An oscillator control system for reciprocating a welding torch comprising a drive motor and an oscillator circuit for alternately varying the direction of rotation of the drive motor. The oscillator circuit includes DC reference means, means responsive to the rotation of the motor for providing an output signal which varies in DC potential from one polarity to the opposite polarity, means which responds to the difference between the reference signal and varying DC signal and switching means which reverses the polarity of the reference signal when the difference signal reverses polarity.

13 Claims, 4 Drawing Figures

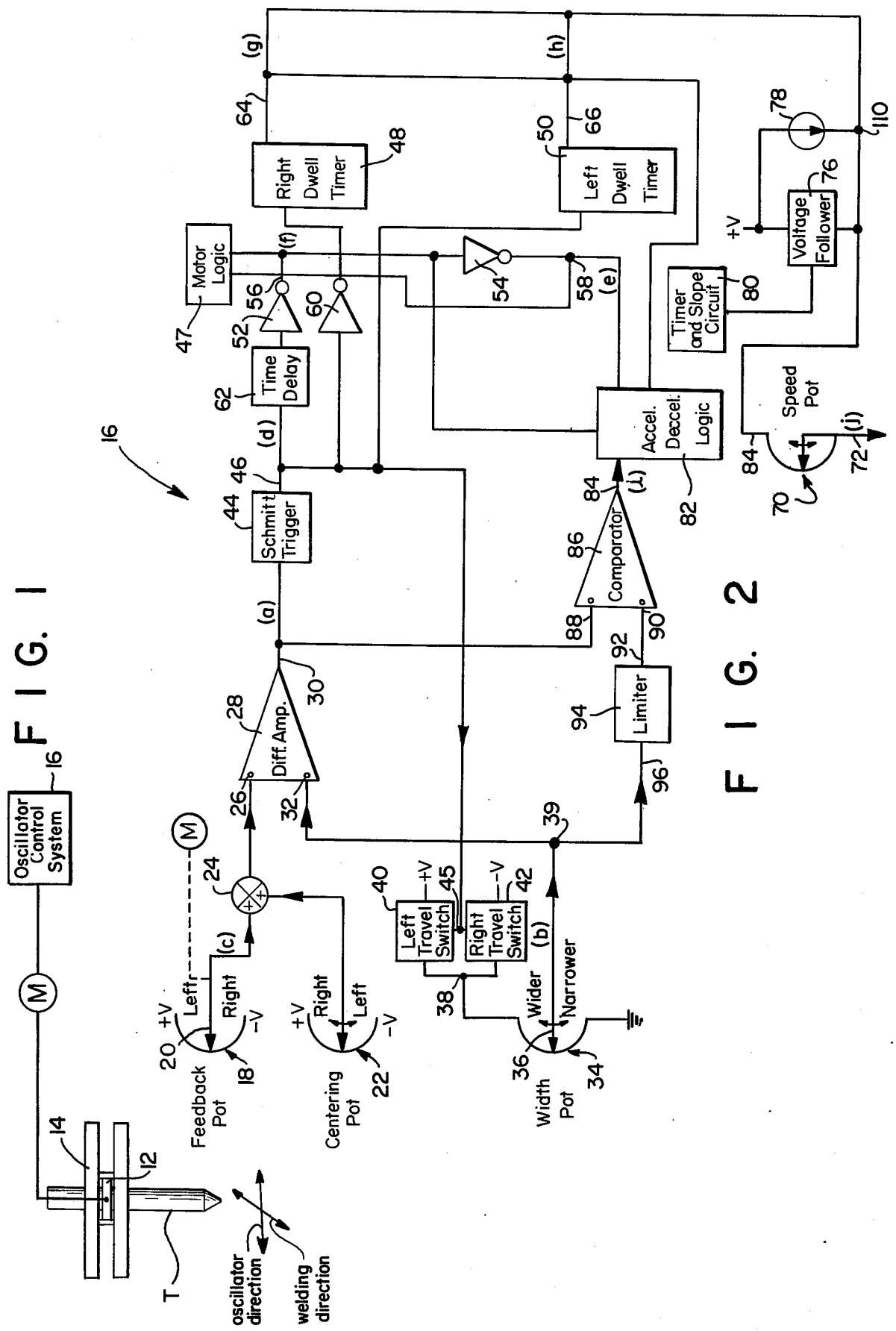

WELDING TORCH OSCILLATOR CONTROL SYSTEM

This invention relates to an electronic oscillator control system for controllably reciprocating a welding torch transverse to the direction of welding.

In certain welding applications such as for example, pipe welding, it is desirable to oscillate the welding torch head in a direction transverse to the line of welding. Known mechanical oscillating systems for alternately reciprocating a welding torch are unwieldy and cumbersome whereas presently available electronic oscillating systems are unreliable and have limited control capability. The welding requirements dictate the desirability to provide control over the following: the frequency of oscillation, the width of oscillation, the center of oscillation independent of control over the width of oscillation, and the ability to decelerate at the end of the torch stroke in each direction and to reaccelerate at the start of each reverse stroke. In addition, it is desirable for the torch to be able to dwell for an adjustable time period at the end of each stroke in each direction of travel. Although some of the above features exist in presently available equipment the ability to adjust the center of oscillation independent of width and the acceleration and deceleration capability are not available.

It is therefore the primary object of the present invention to provide an electronic oscillator control system for a welding torch which provides selective control over the oscillating frequency, the oscillating width (torch stroke), time dwell at the end of the torch stroke in each direction and which incorporates means to decelerate the torch at the end of each stroke in each direction as well as to reaccelerate the torch at the start of each reverse stroke.

It is another object of the present invention to provide an electronic oscillator control system for a welding torch which decelerates and reaccelerates the torch at the ends of the stroke for a predetermined time period proportional to such stroke.

It is yet another object of the present invention to provide an electronic oscillator control system for a welding torch which permits adjustment of the center of oscillation independent of the torch stroke.

It is a further object of the present invention to provide an electronic oscillator control system for a welding torch which may be remotely controlled.

Other objects and advantages of the present invention will become apparent from the following detailed description of the invention when taken in connection with the accompanying drawings in which:

FIG. 1 is a diagrammatic representation of the welding torch and oscillator control system of the present invention;

FIG. 2 is a block diagram of the oscillator control system of the present invention;

DETAILED DESCRIPTION OF THE INVENTION

Referring now to FIG. 1 in which is shown a typical welding torch T-connected to a coupling and slide unit 12 which includes a conventional gear assembly (not shown) for longitudinally reciprocating the torch T along the slide rail 14 in response to rotation of the drive motor M. Rotation of the drive motor M is in turn controlled by the oscillator control system 16 of the present invention. The torch T is caused to alternately travel along the slide rail 14 in a direction transverse to the direction of welding and at a frequency and speed governed by the oscillator control system 16. The means for driving the torch T in the direction of welding to perform the welding operation is not part of the present invention and is accordingly not shown. The distance traversed by torch T in any one direction will be hereinafter referred to as the torch stroke.

Figure 3:
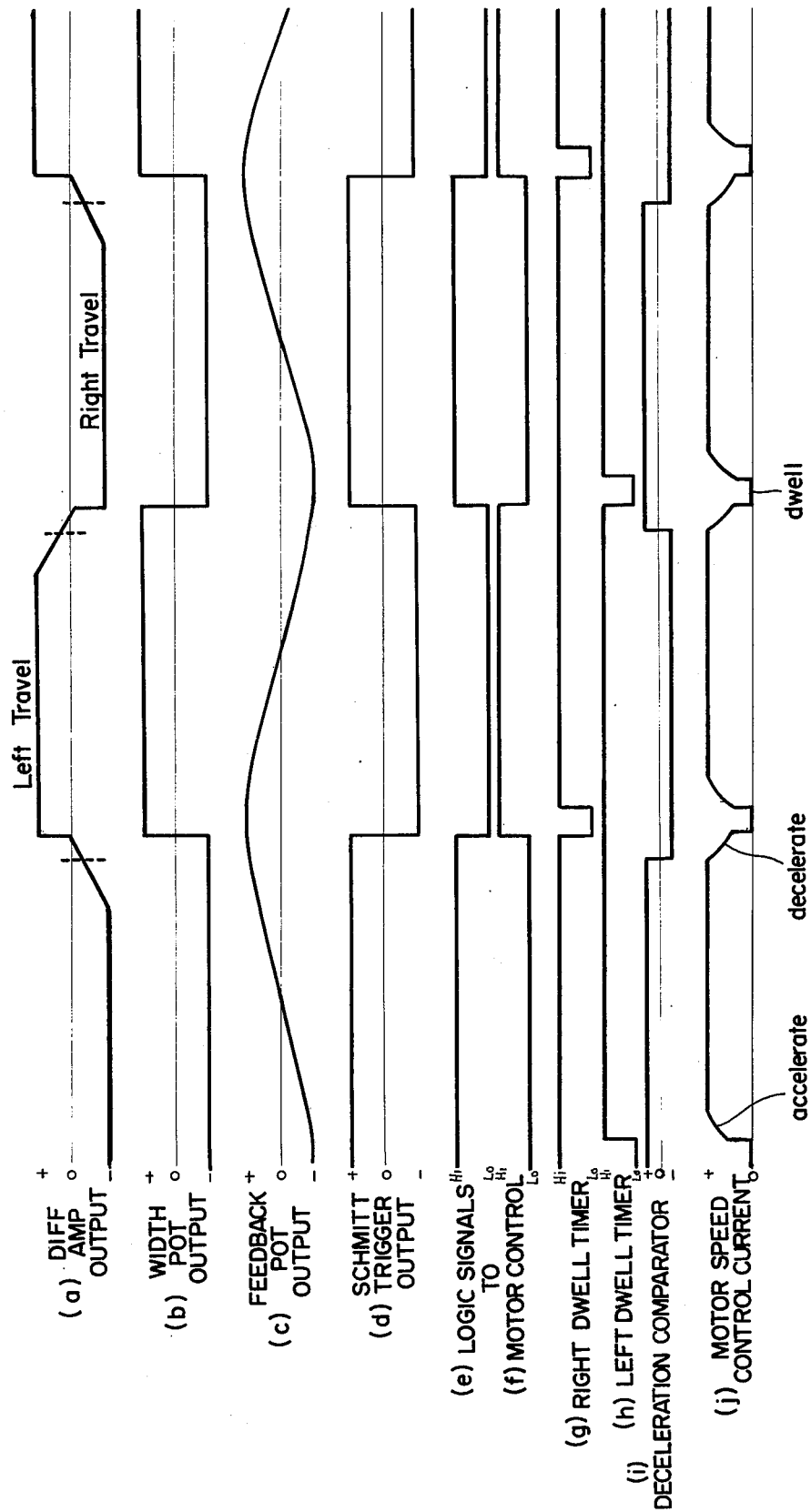
FIG. 3 is a series of electrical waveforms showing typical outputs at the designated locations indicated by the letters a–j in FIG. 2.

The block diagram of the oscillator control system 16 is shown in FIG. 2 with the outputs at certain key designated locations being identified by the letters a–j corresponding to the electrical waveforms in FIG. 3. The feedback potentiometer 18 is ganged to the motor M so that its wiper arm 20 will move in response to the rotation of the motor M resulting in a varying DC output voltage at the wiper arm 20 as represented by waveform (c) in FIG. 3. An adjustable DC output voltage is supplied from the centering potentiometer 22 of either positive or negative polarity. Such voltage is superimposed upon the varying output from feedback potentiometer 18 in a conventional summing network 24 and applied as an input to input terminal 26 of difference amplifier 28. Difference amplifier 28 is a conventional 741 operational amplifier which provides an output 30 equal to the difference between the applied signals at its input terminals 32 and 26 respectively. The output 30 of difference amplifier 28 is represented by waveform (a) in FIG. 3. The input signal applied to terminal 32 of difference amplifier 28 is an adjustable DC reference voltage which is derived from the width potentiometer 34. One end of the width potentiometer 34 is connected to ground potential whereas the opposite end is connected at terminal 38 to two switches 40 and 42 each of which is connected in turn to a positive and negative potential ±V respectively. The wiper arm 36 of the width potentiometer 34 is manually adjustable to provide an output DC reference voltage 39 of adjustable magnitude and of a polarity which is dependent upon which of the two switches 40 and 42 is operational. The output 39 is represented by waveform (b) in FIG. 3.

The output 30 of difference amplifier 28 is applied to a second conventional 741 operational amplifier 44 connected to operate as a conventional schmitt trigger. The output 46 of such schmitt trigger 44 is simultaneously applied to switches 40 and 42 at terminal 45 for alternately enabling and disabling each switch as will be discussed in greater detail hereinafter. The output 46 of the schmitt trigger 44 is represented by waveform (d) in FIG. 3. In addition to controlling the switches 40 and 42 the output 46 of the schmitt trigger 44 is applied to conventional translational logic circuitry 47 to control the angular direction of rotation of drive motor M and the right and left dwell timers 48 and 50 respectively. To reverse the rotation of the drive motor M from clockwise to counterclockwise or vice versa requires the application of two opposite logic signals applied simultaneously to the translational logic circuitry 47 as is well known in the art. A typical translational logic circuit 47 for controlling the direction of rotation of a drive motor M is manufactured by Superior Electric Co. and is identified by the part number STM-1800V. The motor logic signals are generated from the output 46 of schmitt trigger 44 with one being applied to the logic circuit 47 from the output of inverter 52 at terminal 56 and with the other developed by passing the output from inverter 52 through a second inverter 54. The second inverter is connected at terminal 58 to the motor logic circuitry 47. The electrical waveforms at terminals 58 and 56 are identified by the letters e and f in FIG. 3. The output 46 of schmitt trigger 44 is also applied to the right and left direction dwell timers 48 and 50 respectively. The output 46 is first inverted through the inverter 60 before being applied to the right direction dwell timer 48. A time delay circuit 62 is interposed following the output 46 of schmitt trigger 44 to provide a short predetermined delay in time between its application to the motor logic 47, for reversing the direction of rotation of the drive motor M and to the dwell timers 48 and 50 respectively. The output of the right and left dwell timers are identified by the numbers 64 and 66 respectively with their electrical waveforms shown in FIG. 3 and represented by the letters g and h.

The speed of the drive motor M is controlled through a manually adjustable speed potentiometer 70 as is conventional. The speed of the drive motor M is also influenced at each end of the torch stroke by acceleration and deceleration logic circuit 82 in a manner to be explained in greater detail hereinafter. One end 72 of the speed potentiometer 70 may be connected directly to the armature control of the motor M, or to a separate governor control or to any other conventional circuit for ultimately controlling the speed of motor M in proportion to the drive current through the speed potentiometer. The other end 84 is connected to the outputs 64 and 66 of the right and left dwell timers 48 and 50 respectively and to a parallel circuit comprised of a voltage follower 76 and a minimum speed constant current source 78. The voltage follower is coupled in turn through a timer and slope circuit 80 to the acceleration and deceleration logic 82. The acceleration and deceleration logic circuit 82 receives as input signals the outputs 64 and 66 of the right and left dwell timers 48 and 50 respectively; the applied motor logic signals from terminals 56 and 58 respectively; and the output 84 from the comparator 86. The comparator 86 is a conventional 741 operational amplifier adjusted for high gain operation. Comparator 86 has two input terminals 88 and 90 with its terminal 88 being connected to the output 30 of difference amplifier 28 and with the input terminal 90 being connected to the output 92 of limiter 94. The input 96 of limiter 94 is connected to the output DC reference voltage of the width potentiometer 34 at terminal 39.

SYSTEM OPERATION

Referring now to FIGS. 1 to 4 inclusive, each end of the feedback potentiometer 18 is connected to a predetermined voltage V of opposite polarity for defining the outer left and right extremities of the torch stroke. Accordingly, the maximum voltage across the potentiometer 18 is representative of the maximum torch stroke with the instantaneous voltage at its wiper arm 20 representing the actual position of torch T along the slide rail 14. Assume wiper arm 20 is being driven by motor M from a position approximate the end-V and in a direction toward the opposite end+V corresponding to a torch direction of travel from right to left. Also assume that at such time switch 40 is enabled and switch 42 disabled such that the potential impressed across the width potentiometer 34 is positive. Thus, the voltage at wiper arm 36 which is applied to the input 32 of difference amplifier 28 must also be positive and of a predetermined magnitude which is preferably manually adjustable. The voltage applied at input terminal 26 of difference amplifier 28 is equal to the added voltages from wiper arm 20 and the voltage from the centering potentiometer 22. For this particular example assume the centering potentiometer 24 is adjusted for a zero output. Accordingly, the voltage at terminal 26 corresponds directly to the voltage at wiper arm 20 which is negative. The difference amplifier 28 operates on the difference between the inputs at terminals 32 and 26 respectively. Since the input at terminal 26 is negative the resulting input to the difference amplifier 28 will be positive and of a sufficient magnitude to cause the amplifier to be driven into positive saturation. As the torch travels further left the wiper arm 20 passes from a negative voltage to a positive voltage. When such positive voltage approaches the DC reference voltage output at the wiper arm 36 of the width potentiometer 34 the difference voltage between the inputs 32 and 26 of difference amplifier 28 will begin to drop as is more clearly observed in waveform (a) of FIG. 3. When the applied difference signal reaches a predetermined voltage just slightly negative of zero a null occurs and the schmitt trigger 44 fires reversing its output from negative to positive polarity. This in turn causes switch 40 to become disabled and simultaneously enables switch 42. Switch 40 and switch 42 are conventional solid state transistor switches which are shown in more detail in FIG. 4. With switch 42 enabled the voltage at wiper arm 36 of width potentiometer 34 reverses to a negative potential driving the difference amplifier 28 into negative saturation. The reversal in the output 46 of schmitt trigger 44 also causes a reversal in the logic signals to the motor logic circuitry 47 which reverses the direction of rotation of the drive motor M reversing in turn the direction of travel of torch T from left to right. The operation of the oscillating system with the torch T now moving in a direction from left to right is identical to the operation just discussed except in this case the output 30 of difference amplifier 28 remains in negative saturation until the wiper arm 20 reaches a point approaching the right end of the stroke where the applied difference signal between the inputs to the difference amplifier 28 approach zero. As soon as the difference signal reaches a signal just slightly positive of zero a null occurs and the schmitt trigger 44 fires reversing its output which in turn disables switch 42, enables switch 40 and reverses the direction of motor rotation and torch travel. The torch stroke and accordingly the period of oscillation is adjusted by varying the position of wiper arm 36 of the width potentiometer 34. The greater the DC potential at wiper arm 36 the longer the stroke and vice versa. The center of the torch stroke may be varied by adjusting the potentiometer 22 to provide either a positive or negative DC bias voltage which is added to the output of wiper arm 20 thereby shifting the point of null in either direction and in turn shifting the sweep of wiper arm 20 of the potentiometer 18 and accordingly the torch stroke.

The motor speed control current is identified in FIG. 3 by the letter (j). The current is maintained at a steady predetermined rate during each oscillating cycle except for the periods designated accelerate and decelerate and for the dwell periods of time when either the right or left dwell timer is enabled. During the dwell time periods the motor speed control current is at zero.

Figure 4:
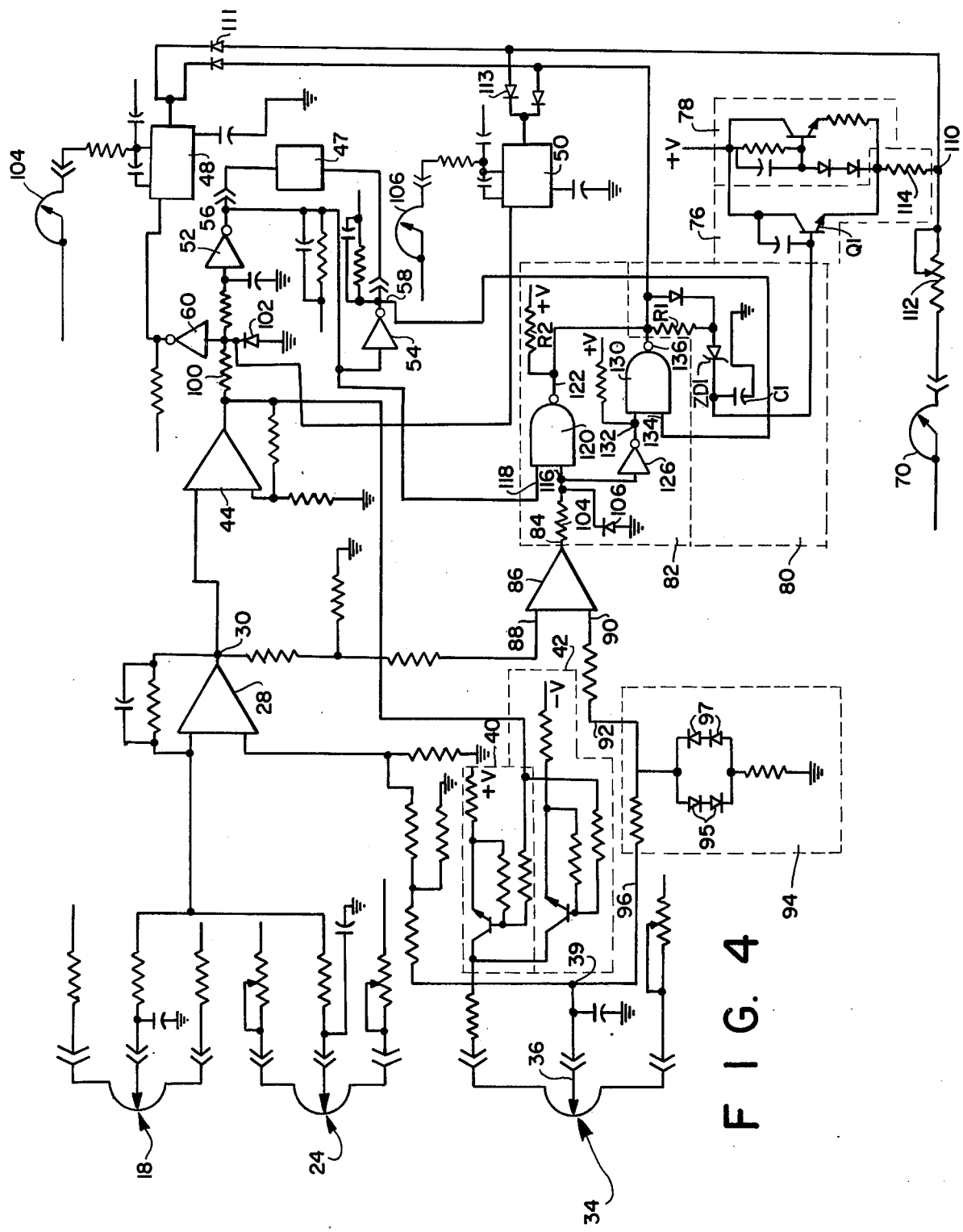
FIG. 4 is a detailed circuit diagram of the system of FIG. 2 shown partially in schematic.

As is more clearly apparent from FIG. 4, reversal in the output 46 of schmitt trigger 44 is converted by the combination of resistor 100 and diode 102 to a logical gate which is applied directly to the left dwell timer 50 and through the inverter 60 to the right dwell timer 48. The time delay provided by each of the dwell timers 48 and 50 is governed by the dwell time potentiometers 104 and 106 respectively. Assume, for example, that the torch T has just completed a stroke and the direction of travel is being reversed from left Travel to Right Travel corresponding to a reversal in the schmitt trigger output 46 from negative to positive voltage. This positive transition will be reversed by inverter 60 thereby enabling the right dwell timer 48. Likewise a transition of schmitt trigger output 46 from positive to negative causes the left dwell timer 50 to be energized. Once either of the dwell timers 48 or 50 energizes its output reverses from a logical High to a logical Low and remains in such state for a period of time which is controlled by the corresponding dwell timer potentiometer 104 and 106 respectively. During the interval of time when the output of the right dwell timer 48 is Low, terminal 110 sees ground potential through diode 111 thereby dropping the motor speed control current to zero. In a similar fashion when the output of the left dwell timer 50 is Low the motor speed potentiometer is essentially grounded at terminal 110 through diode 113. Dwell timers such as 48 and 50 are well known and are available commercially.

The circuitry corresponding to the acceleration and deceleration logic 82, the limiter 94, the timer and slope circuit 80, the voltage follower 76, and the constant current source 78 of FIG. 2 is shown in detail in FIG. 4 with each circuit bracketed by dotted lines and identified with its counterpart number in FIG. 2. Acceleration is initiated after a null has occurred at the end of each torch stroke and upon completion of a dwell period. Deceleration occurs just prior to a null and has a period which is proportional to the torch stroke. The purpose of deceleration is to decrease the motor speed as the torch approaches the end of its stroke whereas the purpose of acceleration is to increase the motor speed at the start of each stroke. During travel in either direction the motor speed is maintained constant provided the speed potentiometer 70 or the speed trimming resistor 112 are not altered. The current through terminal 110 is controlled by the voltage follower 76 which in turn depends upon the charge stored on capacitor C1 of the timer and slope circuit 80. The voltage follower 76 is an emitter follower including transistor Q1 and resistor 114. Capacitor C1 charges to a predetermined voltage through a series circuit formed in combination with zenor diode ZD1, resistor R1, resistor R2 and the source of power +V. Accordingly, any change in voltage across capacitor C1 will be reflected as a change in the motor speed. By discharging capacitor C1 the motor speed will drop at a rate proportional to the rate of capacitor discharge. Likewise, recharging capacitor C1 will accelerate the motor speed and at a rate determined by the rate of recharge.

As indicated heretofore, deceleration occurs just prior to the end of a stroke. As the torch T approaches the end of a stroke, the output 30 of difference amplifier 28 begins to fall from either positive or negative saturation depending on the direction of torch travel. Assume the torch is travelling in a Left direction. For this direction of travel comparator 86 will have a positive signal at both its inputs 88 and 90. The voltage at input 88 is proportional to the output voltage 30 of difference amplifier 28 whereas the voltage at input 90 is proportional to the DC output reference at terminal 39. The input 88 of comparator 86 follows the output voltage 30 and eventually will drop to a voltage below the voltage at input 90 causing the comparator 86 to reverse its output polarity. The comparator output is identified in FIG. 3 by the letter (i) and shows a reversal from negative to positive potential at a predetermined point during left travel just prior to a null. The instant of crossover between the inputs 88 and 90 causes the reversal in the output 84 and is proportional to the setting of the wiper arm 36 of the width potentiometer 34. As the width potentiometer 34 is varied to increase its output potential, corresponding to an increase in torch stroke, the instant of crossover between the inputs 88 and 90 of comparator 86 will occur earlier in time which, as will be explained in more detail hereafter, increases the period of deceleration. Likewise a decrease in the output voltage of the width potentiometer 34 will cause the crossover instant to occur later in time and as such shorten the period of deceleration. In this fashion the deceleration period or distance is tailored to the torch stroke. In order to avoid an excessive period of deceleration the voltage at input 90 is limited by limiter 94 to a maximum level. The limiter 94 is a conventional diode limiter wherein the set of diodes 95 and 97 operate essentially as an open circuit to voltages below a predetermined limit, and as a clamp to higher voltages above a predetermined level.

The transition from negative to positive potential in the output 84 of the comparator 86 is applied to resistor 104 and diode 106 in the acceleration and deceleration circuit 82 which converts such transition to a logical High. This causes a High to appear at pin 116 of NAND gate 120. NAND gates 120 and 130 are conventional NAND gates which have a High output for any combination of logical inputs except when both inputs are at logical High in which case the High output reverses to a Low output. Since pin 118 of NAND gate 120 is connected to terminal 56 which is at High during Left Travel, the output 122 of NAND gate 120 will reverse to a logical Low at the instant of transition in the output 84 of comparator 86. This initiates the discharge of capacitor C1 through zenor diode ZD1 and resistor R1 to ground potential. The zenor diode ZD1 limits the extent of the drop in voltage. The constant current source 78 further limits the minimum current flow through terminal 110 overriding the voltage follower 76 at a predetermined potential across the common resistor 114. Thus the motor speed control current through the speed potentiometer 70 will drop to a predetermined minimum until a null is reached. A further advantage of the constant current source 78 is to automatically eliminate deceleration at operating motor speeds which are very low where deceleration is not needed. A conventional constant current circuit 78 is used.

At higher speeds deceleration will occur and is dependent upon the setting of the width potentiometer 34. Since the width potentiometer controls the torch stroke and since its adjustment will also advance or delay the crossover instant between the inputs 88 and 90 to the comparator 86 an accurate proportionality is established between the deceleration period and the torch stroke.

When the torch is travelling in the opposite or Right direction and approaches the end of the stroke the comparator output 84 makes a transition from positive to negative potential at the instant the inputs 88 and 90 crossover. This transition is converted to a logical Low at pin 116 of NAND gate 120 and is inverted by inverter 126 to a logical High at pin 132 of NAND gate 130. Pin 134 is connected to terminal 58 which is at a logical High during Right Travel. Thus the output 136 reverts to a logical Low at such transition time initiating deceleration at the end of Right Travel in the same fashion as indicated hereinabove with travel in the Left direction.

Acceleration occurs at the start of a reverse stroke when the schmitt trigger 44 reverses its output polarity. Upon reversing from Left to Right Travel pin 118 of NAND gate 120 reverts from a logical High to a logical Low reverting the output 122 of NAND gate 120 to a logical High. Since the output 84 of comparator 86 is positive during Right Travel a logical Low will be present at pin 132 of NAND gate 130 and its output 136 will also be High. With the NAND gate outputs 122 and 136 at logical High the charging path for capacitor C1 is restored through resistor R2. Likewise upon reversing from Right to Left Travel pin 134 of NAND gate 130 reverts from a logical High to a logical Low causing its output 136 to revert to a logical High. During Left Travel output 84 of comparator 86 is negative which applies a logical low to NAND gate 120 at pin 116. Thus the output 122 of NAND gate 120 is at a logical High and capacitor C1 will recharge through resistors R1 and R2.

I claim:

1. A welding torch oscillator control system including a drive motor, means for rectilinearly reciprocating said torch in response to rotation of said drive motor, and an oscillator circuit for alternately varying the direction of rotation of said drive motor, said oscillator circuit comprising:
   first means for providing a DC reference potential the polarity of which is representative of the direction of torch travel;
   second means responsive to the rotation of said motor for providing an output signal which varies from a predetermined DC potential of one polarity to another predetermined DC potential of opposite polarity;
   third means coupled to said first and second means for providing a control signal having a polarity responsive to the difference between said DC reference potential and said varying output signal;
   switching means coupled to said first and third means for reversing the polarity of said DC reference potential upon the occurrence of a change in polarity in said control signal;
   motor speed circuit means for controlling the speed of said drive motor;
   fourth means coupled to said first and third means for providing a speed adjustment signal in each stroke at a predetermined instant proportional to when said control signal equals said DC potential; and
   deceleration control means responsive to the occurrence of said speed adjustment signal for decreasing the current in said motor speed circuit means at a predetermined rate until substantially zero current flows in said circuit.

2. A welding torch oscillator control system as defined in claim 1 wherein said DC reference potential is manually adustable for controlling the torch stroke.

3. A welding torch oscillator control system as defined in claim 2 further comprising:
   means for providing an adjustable DC bias signal of predetermined polarity and means for superimposing said signal upon the output signal of said second means.

4. A welding torch oscillator control system as defined in claim 1 further comprising means for limiting the maximum amplitude of said DC reference potential being applied to said comparator means.

5. A welding torch oscillator control system as defined in claim 4 further comprising means responsive to a predetermined minimum current in said motor speed circuit means for overriding sid deceleration control means when the motor speed current reaches said predetermined minimum.

6. A welding torch oscillator control system as defined in claim 4 wherein said deceleration control means comprises:
   means including a capacitor, said capacitor being charged to a predetermined potential and means for providing a predetermined path of discharge for said capacitor in response to the occurrence of said speed adjustment signal.

7. A welding torch oscillator control system as defined in claim 6 further comprising acceleration control means responsive to a change in the polarity of said control signal for providing a predetermined charging path for said capacitor so as to reestablish said predetermined potential whereby the speed of said drive motor is accelerated until a predetermined current is established in said motor speed circuit means.

8. A welding torch oscillator control system as defined in claim 7 further comprising time delay means responsive to a change in the polarity of said control signal for disabling said drive motor for a predetermined period of time.

9. A welding torch oscillator control system as defined in claim 1 wherein said third means for providing a control signal comprises a difference amplifier coupled to said switch means and wherein said DC reference potential and said varying output signal are applied as input signals to said difference amplifier.

10. A welding torch oscillator control system as defined in claim 1 wherein said fourth means for providing a speed adjustment signal comprises a comparator coupled to said deceleration control means and wherein said DC reference potential and said control signal are applied as input signals to said comparator.

11. A welding torch oscillator control system as defined in claim 1 further comprising acceleration control means responsive to a change in the polarity of said control signal for increasing the current in said motor speed circuit means at a predetermined rate until a predetermined current is established.

12. A welding torch oscillator control system including a drive motor, means for rectilinearly reciprocating said torch in response to rotation of said drive motor, and an oscillator circuit for alternately varying the direction of rotation of said drive motor, said oscillator circuit comprising:
   a difference amplifier;
   first means for providing a DC reference potential the polarity of which is representative of the direction of torch travel;

second means responsive to the rotation of said motor for providing an output signal which varies from a predetermined DC potential of one polarity to another predetermined DC potential of opposite polarity;

said first and second means being coupled to said difference amplifier with said DC reference potential and said varying output signal being applied as input signals thereto;

said difference amplifier providng an output control signal having a polarity responsive to the differnce between said DC reference potential and said varying output signal;

switch means coupled to the output of said difference amplifier for reversing the polarity of said DC reference potential upon the occurrence of a change in polarity in said control signal;

motor speed circuit means for controlling the speed of said drive motor;

comparator means coupled to the output of said difference amplifier and to said first means for providing a speed adjustment signal in each stroke at a predetermined instant proportional to when said control signal equals said DC reference voltage; and deceleration control means coupled to the output of said comparator means for decreasing the current in said motor speed circuit means at a predetermined rate in response to the occurrence of said speed adjustment signal until substantially zero current flows in said circuit.

13. A welding torch oscillator control system as defined in claim 12 further comprising acceleration control means coupled to the output of said comparator means for increasing the current in said motor speed circuit means at a predetermined rate in response to a change in the polarity of said control signal until a predetermined current is established.

* * * * *

UNITED STATES PATENT AND TRADEMARK OFFICE
CERTIFICATE OF CORRECTION

PATENT NO. : 4,034,184
DATED : July 5, 1977
INVENTOR(S) : Robert C. Fernicola

It is certified that error appears in the above-identified patent and that said Letters Patent are hereby corrected as shown below:

Claim 5, line 4 (column 8, line 17) "sid" should read -- said --.

Signed and Sealed this

Twenty-ninth Day of May 1979

[SEAL]

Attest:

RUTH C. MASON
Attesting Officer

DONALD W. BANNER
Commissioner of Patents and Trademarks